(12) United States Patent
Blust et al.

(10) Patent No.: US 8,783,455 B2
(45) Date of Patent: Jul. 22, 2014

(54) METHOD AND APPARATUS FOR STORING A DISC

(75) Inventors: Donald Blust, Milwaukee, WI (US); Thomas Driscoll, Cedarburg, WI (US)

(73) Assignee: NCR Corporation, Duluth, GA (US)

( * ) Notice: Subject to any disclaimer, the term of this patent is extended or adjusted under 35 U.S.C. 154(b) by 960 days.

(21) Appl. No.: 11/888,593

(22) Filed: Jul. 31, 2007

(65) Prior Publication Data

US 2009/0032414 A1 Feb. 5, 2009

(51) Int. Cl.
B65D 85/57 (2006.01)

(52) U.S. Cl.
USPC .......................................... 206/308.1

(58) Field of Classification Search
USPC ............... 206/308.1, 308.2, 308.3, 309, 307
See application file for complete search history.

(56) References Cited

U.S. PATENT DOCUMENTS

| | | | | |
|---|---|---|---|---|
| 3,825,112 A * | 7/1974 | Schumaker et al. | ........... | 206/310 |
| 3,860,248 A * | 1/1975 | Hunt et al. | ................. | 206/308.3 |
| 4,573,572 A * | 3/1986 | Kato et al. | .................... | 206/303 |
| 4,613,044 A * | 9/1986 | Saito et al. | ................. | 206/308.1 |
| 5,385,235 A * | 1/1995 | Ikebe et al. | ................. | 206/308.1 |
| 5,450,952 A * | 9/1995 | Funawatari et al. | ........ | 206/308.3 |
| 5,531,324 A * | 7/1996 | Kosaki et al. | ............... | 206/308.1 |
| 5,590,768 A * | 1/1997 | Hilton et al. | ................ | 206/308.1 |
| 5,695,053 A * | 12/1997 | Koh et al. | .................. | 206/308.1 |
| 5,881,871 A * | 3/1999 | Ikebe et al. | ................. | 206/308.1 |
| 5,912,875 A * | 6/1999 | Lowe et al. | | |
| 5,915,549 A * | 6/1999 | Palmer et al. | ............. | 206/308.1 |
| 5,954,198 A * | 9/1999 | Ikebe et al. | ................. | 206/308.3 |
| 5,960,948 A * | 10/1999 | Shiga et al. | ................. | 206/308.3 |
| 5,988,374 A * | 11/1999 | Funawatari et al. | ........ | 206/308.1 |
| 5,996,785 A * | 12/1999 | Palmer et al. | ............. | 206/308.1 |
| 6,123,190 A * | 9/2000 | Kuboduka | ................. | 206/308.3 |
| 6,273,247 B1 * | 8/2001 | Harada et al. | ................. | 206/307 |
| 6,409,012 B2 * | 6/2002 | Shiga et al. | ................. | 206/308.3 |
| 6,902,055 B2 * | 6/2005 | Hanakawa et al. | ........ | 206/308.1 |
| 6,942,093 B2 * | 9/2005 | Timpe et al. | ................ | 206/308.1 |
| 2007/0062828 A1 * | 3/2007 | Edwards et al. | ........... | 206/308.1 |

* cited by examiner

*Primary Examiner* — Andrew Perreault
(74) *Attorney, Agent, or Firm* — Peter H. Priest

(57) ABSTRACT

A method and apparatus for storing a disc, such as a CD or DVD. A disc storage case includes a housing having a top wall coupled to a bottom wall with a first side wall, a second side wall, a third side wall, and a fourth side wall. The top wall, the bottom wall, and the four side walls define an enclosure. The case also includes an opening in the fourth side wall for access to the enclosure and is adapted to receive a disc. The case also includes a first member adjacent the first side wall and a second member adjacent the third side wall. The first member and the second member are adapted to cooperate to receive and secure the disc within the enclosure.

14 Claims, 19 Drawing Sheets

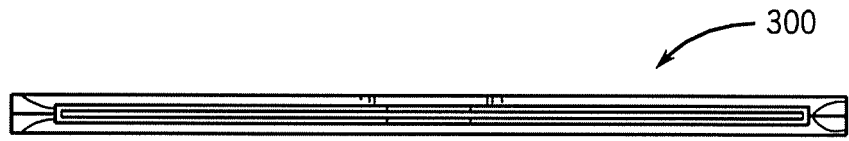
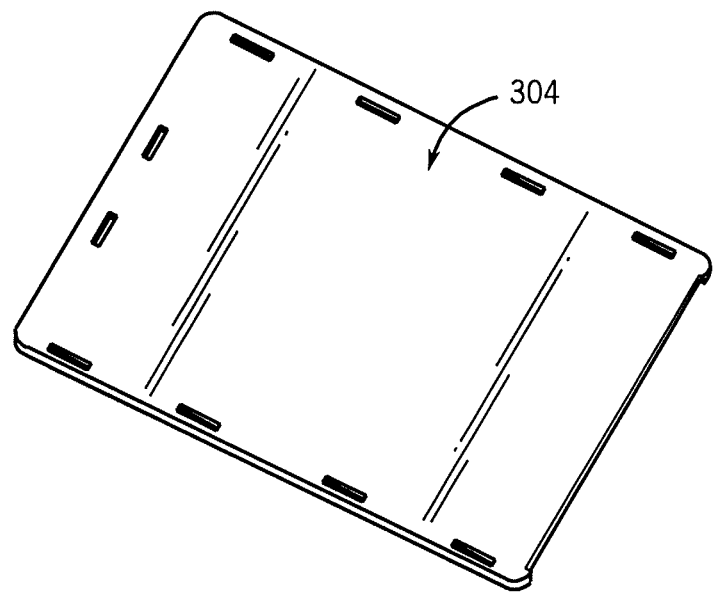
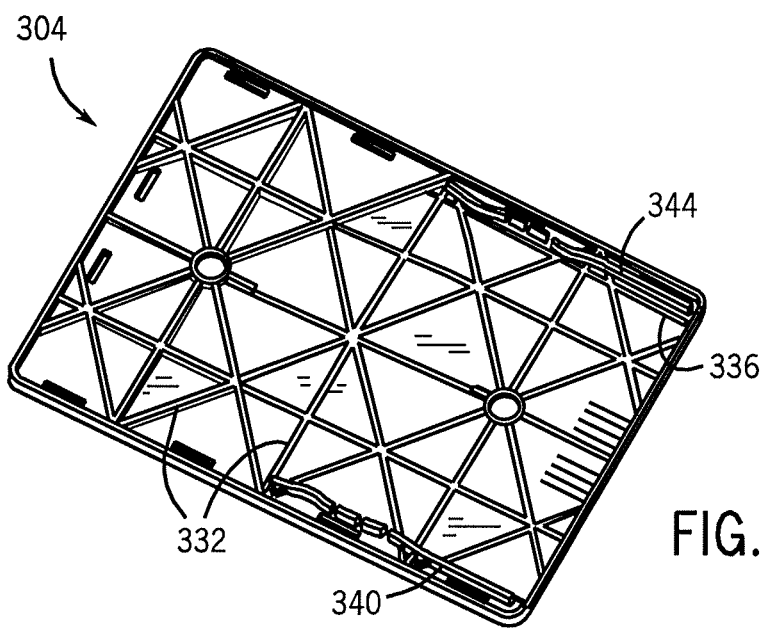

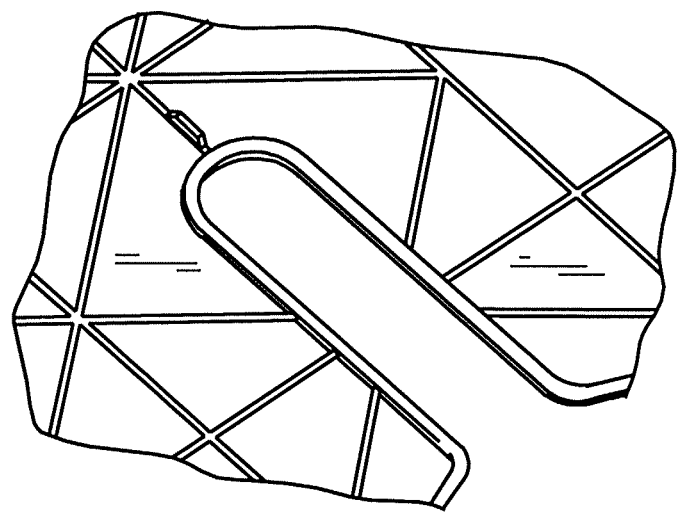
FIG. 15
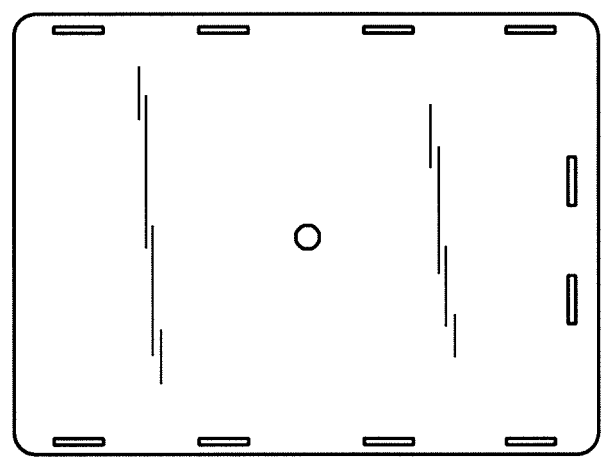
FIG. 16
FIG. 17

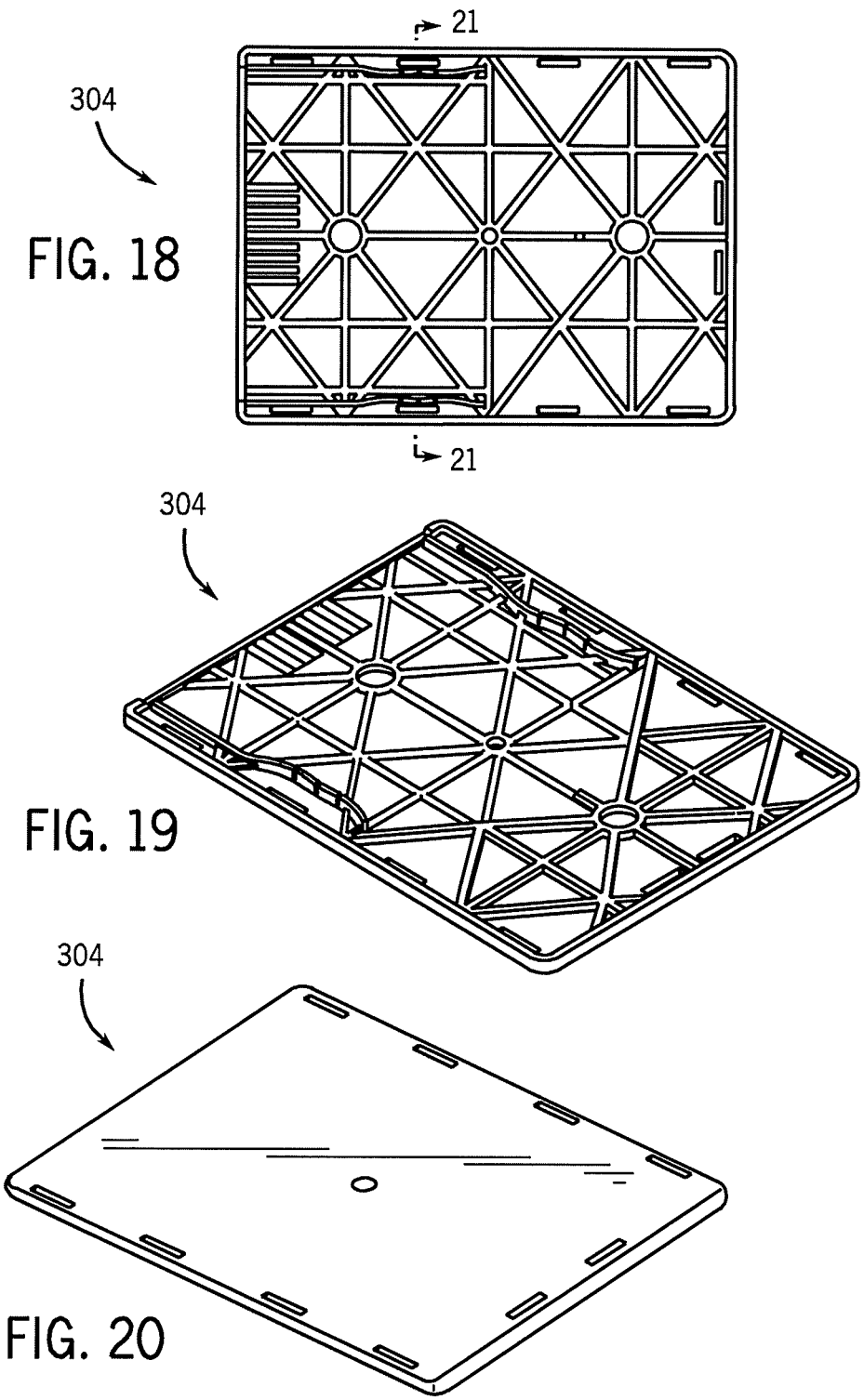

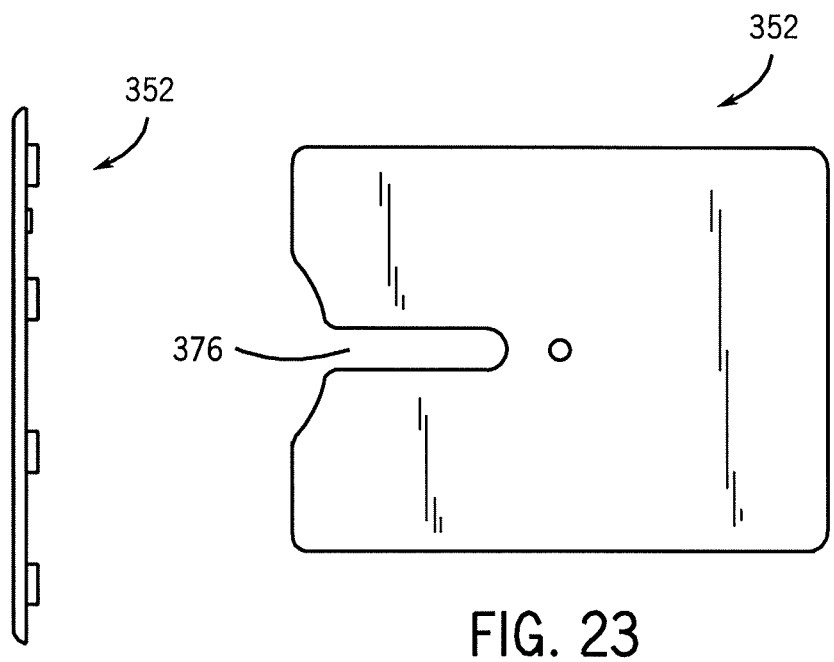
FIG. 23
FIG. 24
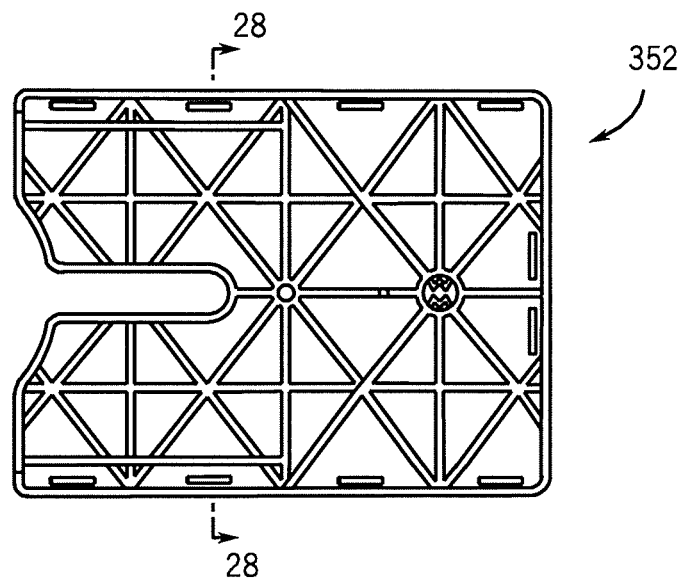
FIG. 25

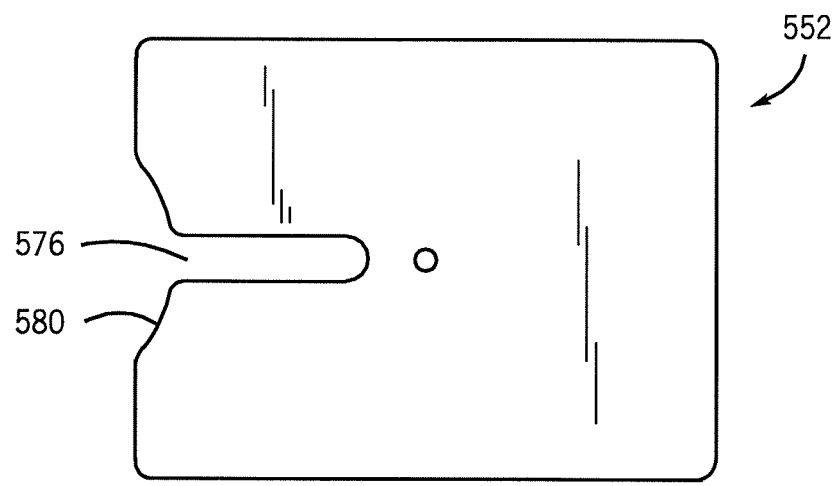
FIG. 37
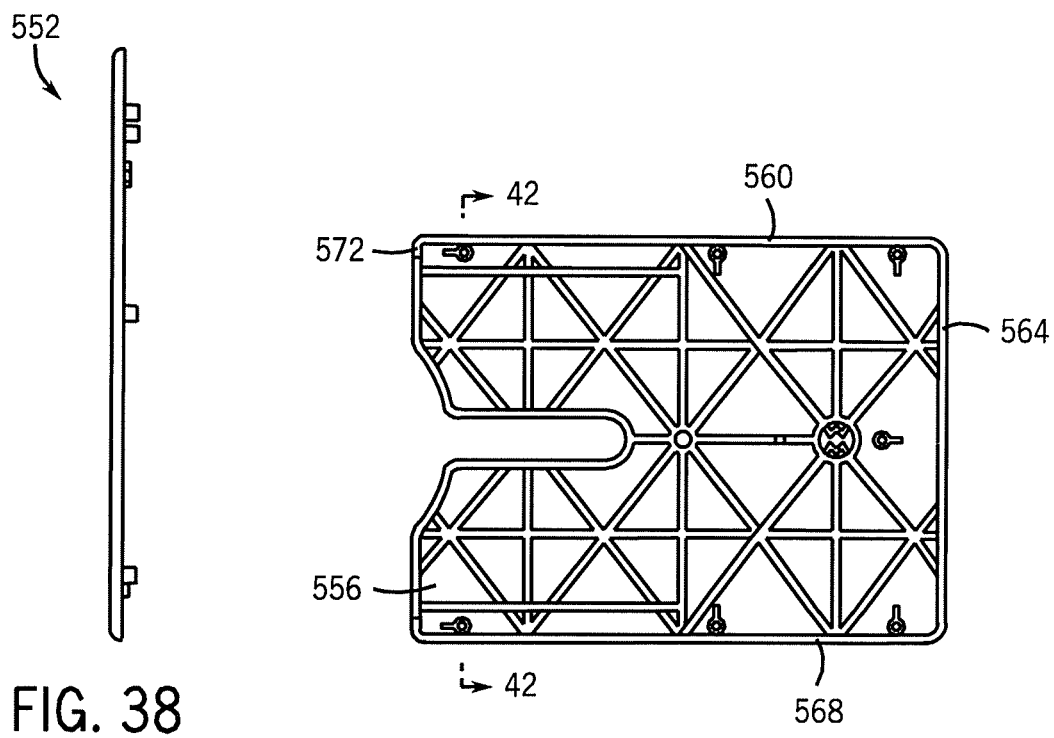
FIG. 38
FIG. 39

METHOD AND APPARATUS FOR STORING A DISC

BACKGROUND

The compact disc (CD) and digital video disc (DVD) are the leading portable, digital data storage formats. Hundreds of millions of discs are produced each year. These discs are used to store digital data files including, but not limited to music, music videos, video, game software, productivity software and a wide array of additional file types and file formats.

These discs are available in pre-recorded, recordable and rewritable formats. Increasingly the consumer is utilizing the recordable and rewritable versions of these media formats to store and/or transport data files, still images, video images, music files, and a wide array of additional file types and file formats.

The CD and DVD disc surfaces are soft and prone to scratching. Once scratched they may become unreadable. To protect these discs during transport and to enable uniform stacking and storage of this media, many different case styles have been created and are sold commercially.

The vast majority of these cases are constructed with a hinge. To store a disc the user first opens the disc case then typically places the disc on a dowel that matches the inner diameter of the disc torus. The user then closes the case. To remove a disc the user first opens the disc case, pulls the disc from its stored position, then closes the disc case.

SUMMARY

The present invention relates to a hinge-less disc case for CDs and DVDs, for example. The case never has to be opened or closed and is thinner and more compact than most hinged case designs. Because the hinge-less case is never opened or closed it is generally dimensionally uniform. This dimensionally uniform case design is desirable in a multitude of retail settings including in an automated retail setting where some mechanism is used to retrieve and deliver a unit of inventory. In an automated retail environment, the automated material handling equipment may be unable to handle a hinged disc case that is open.

In the present invention, the hinge-less disc case is constructed with two opposing retention features or "saddles." The saddles deflect when the disc is pressed into the case and spring back to their original shape when the disc is in its final resting position, effectively straddling the disc. These saddles hold the disc tightly in place such that the case can be turned upside down and shaken and yet the disc will not release. These saddles also keep the disc from rotating when the disc is stored in the case.

The hinge-less disc case of the present invention includes an internal channel on the lift and right sides of the disc case. These narrow, low height channels ensure that the top and bottom disc surfaces do not rub on the cases interior surfaces as this may scratch the disc. The only portion of the disc surface that makes contact with the case is the very outer edge of the top and bottom disc surfaces as well as a portion of the side of the disc held in the saddle.

The hinge-less disc case also includes a scallop feature. While stored, a small portion of the disc's top or bottom surface is revealed through a scallop and channel feature on the top of the hinge-less disc case. This feature enables the user to draw the disc out of its stored position by placing a finger through the disc torus and pulling the disc out of the disc case. This opening also enables the user to readily identify that a disc is stored in the case and perhaps to identify which disc is stored in the case.

The hinge-less disc case includes flat exterior surfaces and can support any suitable graphic treatment, such as adhesive-backed stickers and/or silk screened graphics. The material of the case can be translucent or opaque.

The hinge-less disc case includes structural supports throughout to reinforce the disc case. This structural reinforcement is beneficial in a mechanical or automated pick and place environment where the disc case may be squeezed or gripped tightly. The structural supports ensure that the disc case does not deform despite being gripped tightly.

In one embodiment, the invention provides a method and apparatus for storing a disc, such as a CD or DVD. A disc storage case includes a housing having a top wall coupled to a bottom wall with a first side wall, a second side wall, a third side wall, and a fourth side wall. The top wall, the bottom wall, and the four side walls define an enclosure. The case also includes an opening in the fourth side wall for access to the enclosure and is adapted to receive a disc. The case also includes a first member adjacent the first side wall and a second member adjacent the third side wall. The first member and the second member are adapted to cooperate to receive and secure the disc within the enclosure.

In another embodiment, the invention provides a disc storage case comprising a housing including a plurality of walls and defining an enclosure. The case also includes an opening through the housing for access to the enclosure. The case also includes a channel in communication with the opening, the channel adapted for used during insertion and removal of a disc. The case further includes a first member adjacent one of the walls of the housing and a second member adjacent a second one of the walls of the housing, at least a portion of the first member and the second member adapted to flex during the insertion and removal of the disc through the opening.

In yet another embodiment, the invention provides a disc storage case comprising a first housing and a second housing coupled to the first housing and forming a compartment therein. The case also includes an opening through at least a portion of the first housing and the second housing, the opening adapted to provide access to the compartment and being sized for a DVD. The case also includes a channel in communication with the opening, the channel formed in one of the first housing and the second housing, a distal end of the channel being aligned with a portion of the DVD torus. The case further includes a member supported by one of the first housing and the second housing, at least a portion of the member adapted to flex during insertion and removal of the disc through the opening.

Other aspects of the invention will become apparent by consideration of the detailed description and accompanying drawings.

BRIEF DESCRIPTION OF THE DRAWINGS

FIG. 8 is a front perspective view of the disc storage case illustrated in FIG. 4.

FIG. 9 is a rear perspective view of the first housing illustrated in FIG. 4.

FIG. 10 is a perspective view of the first housing illustrated in FIG. 4.

FIG. 15 is an enlarged perspective view of a portion of the second housing illustrated in FIG. 13.

FIG. 16 is a rear view of the first housing illustrated in FIG. 4.

FIG. 17 is a side view of the first housing illustrated in FIG. 4.

FIG. 18 is a front view of the first housing illustrated in FIG. 4.

FIG. 19 is a front perspective view of the first housing illustrated in FIG. 4.

FIG. 20 is a rear perspective view of the first housing illustrated in FIG. 4.

FIG. 23 is a rear view of the second housing illustrated in FIG. 12.

FIG. 24 is a side view of the first housing illustrated in FIG. 12.

FIG. 25 is a front view of the first housing illustrated in FIG. 12.

FIG. 37 is a rear view of a second housing of a disc storage case according to the fourth embodiment of the invention.

FIG. 38 is a side view of the second housing illustrated in FIG. 37.

FIG. 39 is a front view of the second housing illustrated in FIG. 37.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Although directional references, such as upper, lower, downward, upward, rearward, bottom, front, rear, etc., may be made herein in describing the drawings, these references are made relative to the drawings (as normally viewed) for convenience. These directions are not intended to be taken literally or limit the present invention in any form. In addition, terms such as "first," "second," and "third" are used herein for purposes of description and are not intended to indicate or imply relative importance or significance.

Figure 1:
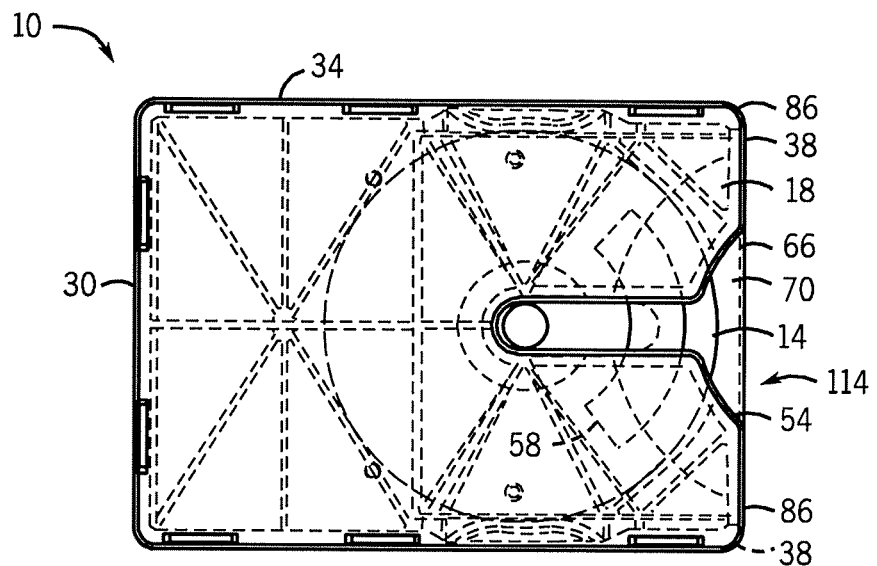
FIG. 1 is a top view of a disc storage case according to a first embodiment of the invention.
Figure 2:
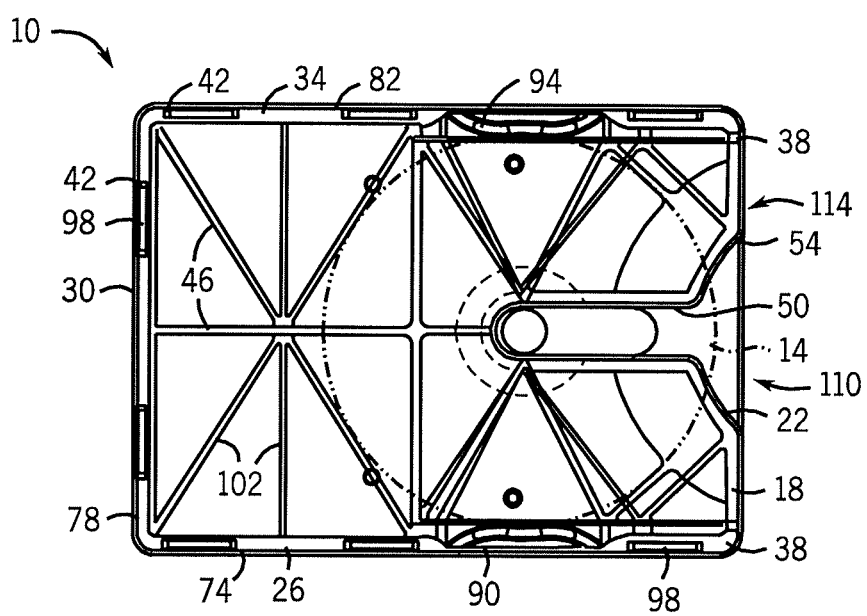
FIG. 2 is another top view of the disc storage case illustrated in FIG. 1.
Figure 3:
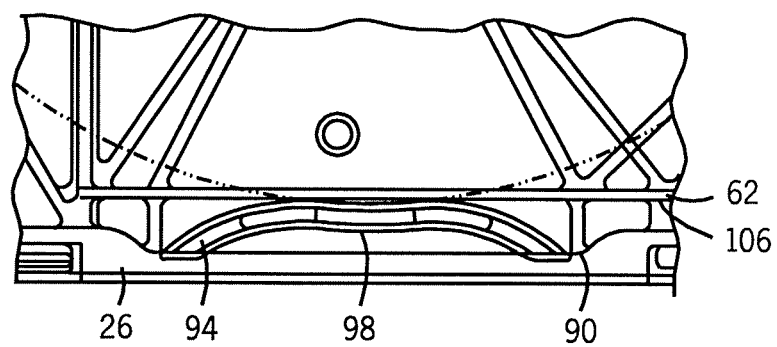
FIG. 3 is an enlarged top view of a portion of the disc storage case illustrated in FIG. 1.
Figure 4:
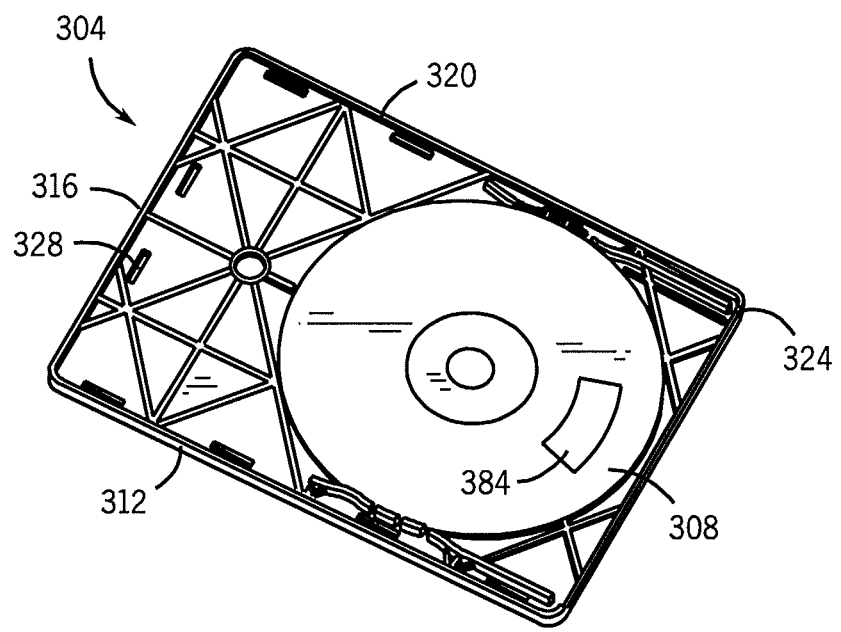
FIG. 4 is a perspective view of a first housing of a disc storage case according to a third embodiment of the invention.
Figure 5:
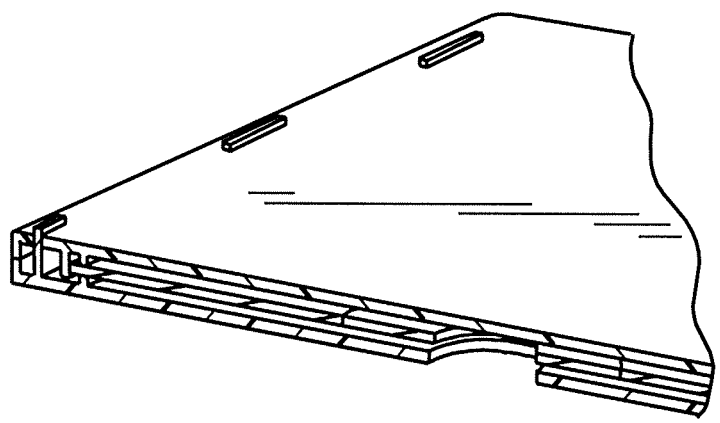
FIG. 5 is a cross-sectional perspective view of the disc storage case illustrated in FIG. 4.
Figure 6:
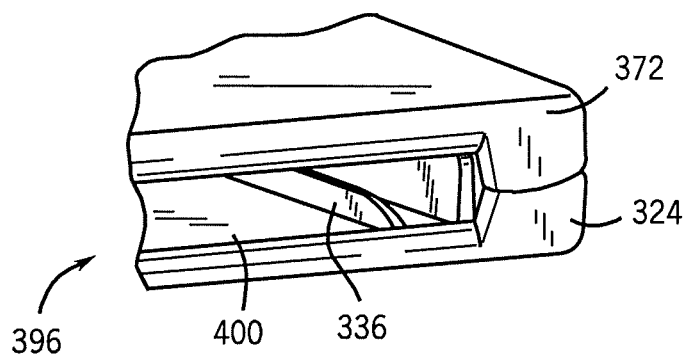
FIG. 6 is an enlarged perspective view of a portion of the disc storage case illustrated in FIG. 4.
Figure 7:
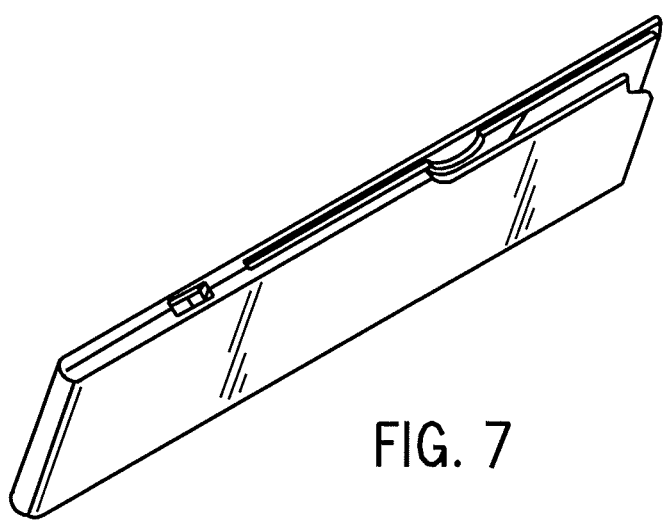
FIG. 7 is a cross sectional perspective view of the disc storage case illustrated in FIG. 4.
Figure 11:
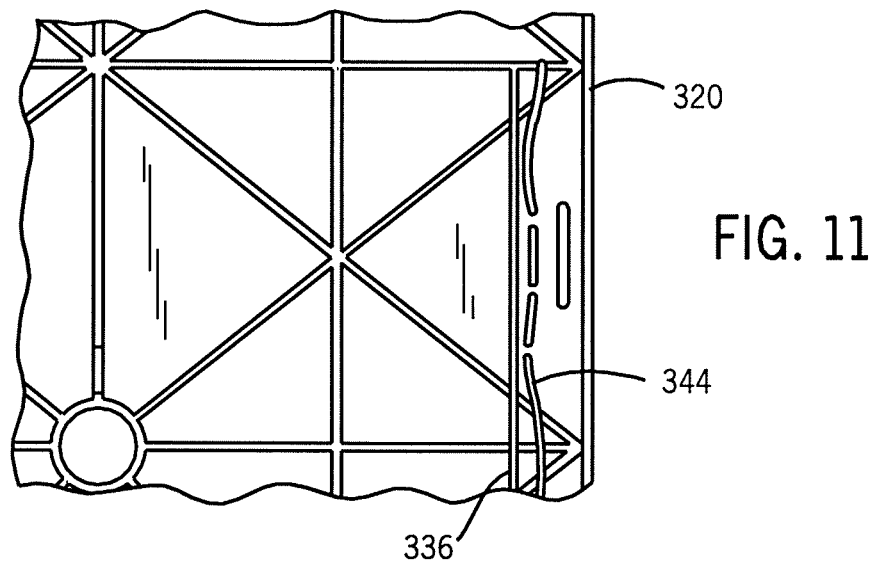
FIG. 11 is an enlarged front view of a portion of the first housing illustrated in FIG. 4.
Figure 12:
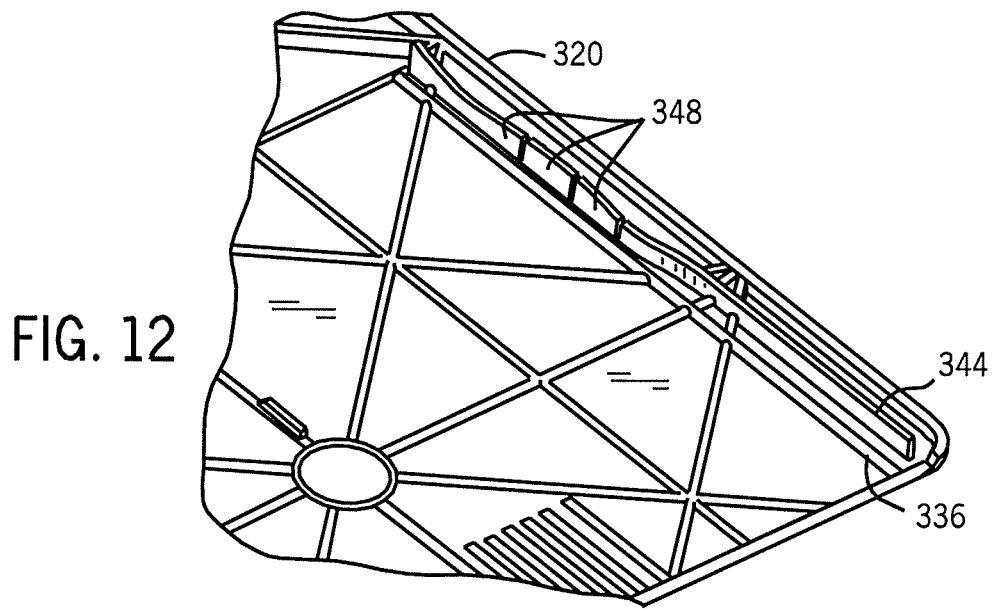
FIG. 12 is an enlarged perspective view of a portion of the first housing illustrated in FIG. 4.
Figure 13:
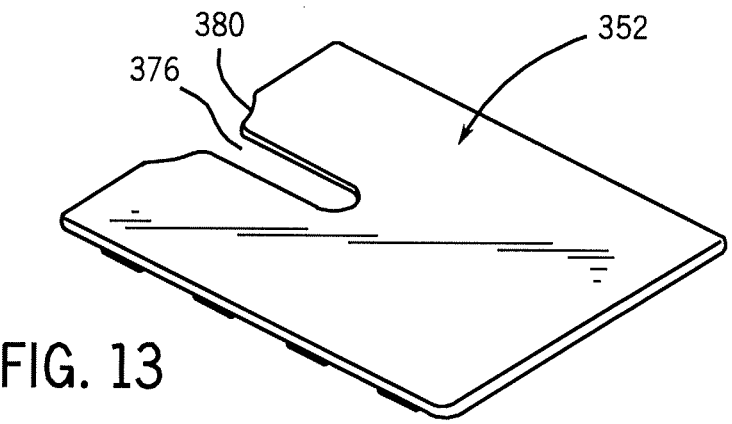
FIG. 13 is a rear perspective view of a second housing of a disc storage case according to the third embodiment of the invention.
Figure 14:
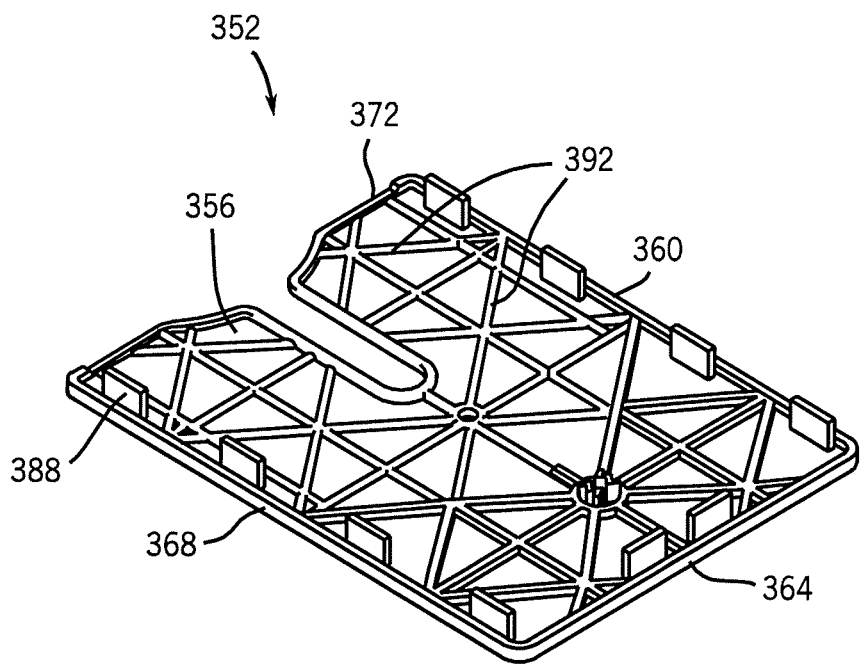
FIG. 14 is a front perspective view of the second housing illustrated in FIG. 13.
Figure 21:
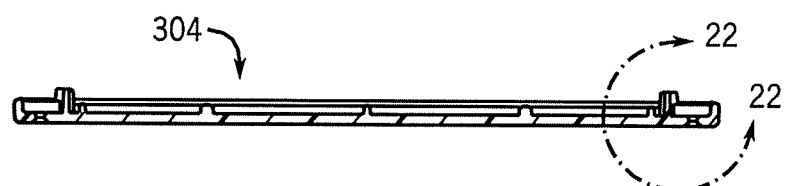
FIG. 21 is a cross-sectional view of section A-A of the first housing illustrated in FIG. 20.
Figure 22:
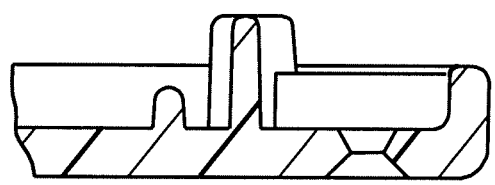
FIG. 22 is an enlarged view of section B illustrated in FIG. 21.
Figure 26:
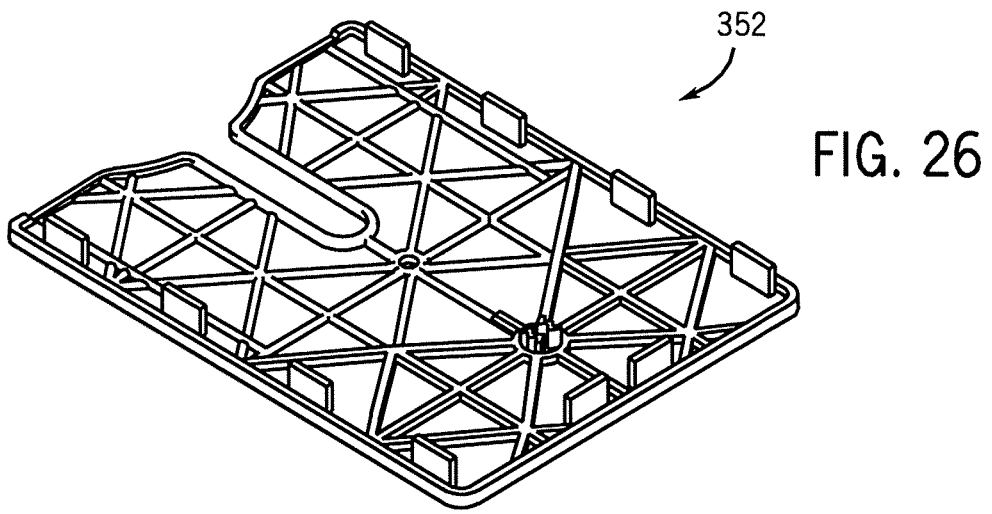
FIG. 26 is a front perspective view of the first housing illustrated in FIG. 12.
Figure 27:
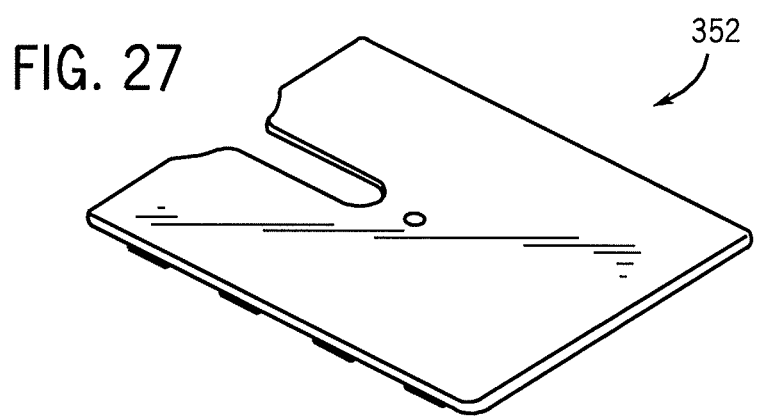
FIG. 27 is a rear perspective view of the first housing illustrated in FIG. 12.
Figure 28:
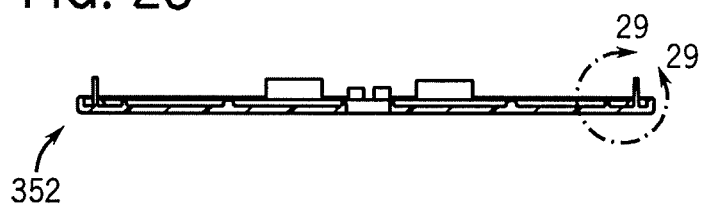
FIG. 28 is a cross-sectional view of section A-A of the first housing illustrated in FIG. 25.
Figure 29:
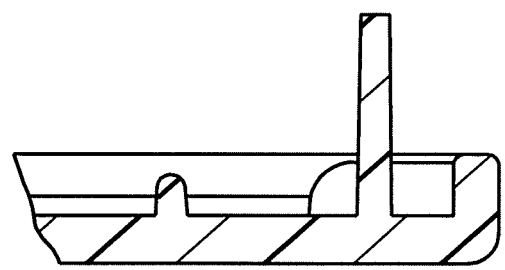
FIG. 29 is an enlarged view of section B illustrated in FIG. 28.
Figures 30, 31:
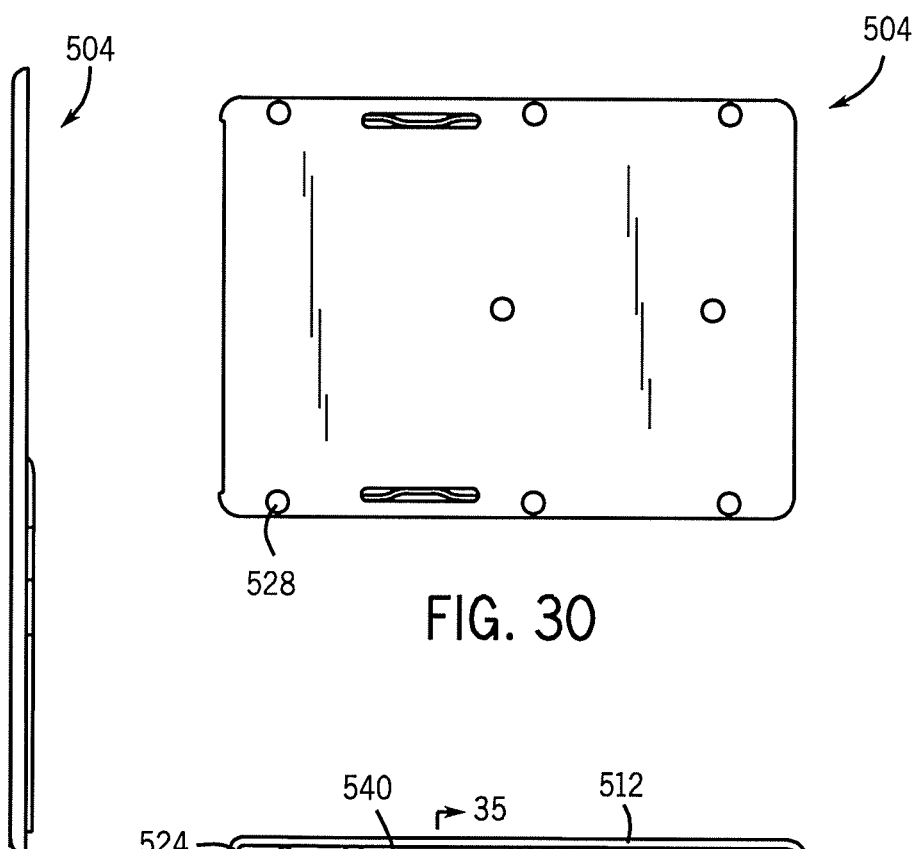
FIG. 30 is a rear view of a first housing of a disc storage case according to a fourth embodiment of the invention.
FIG. 31 is a side view of the first housing illustrated in FIG. 30.
Figure 32:
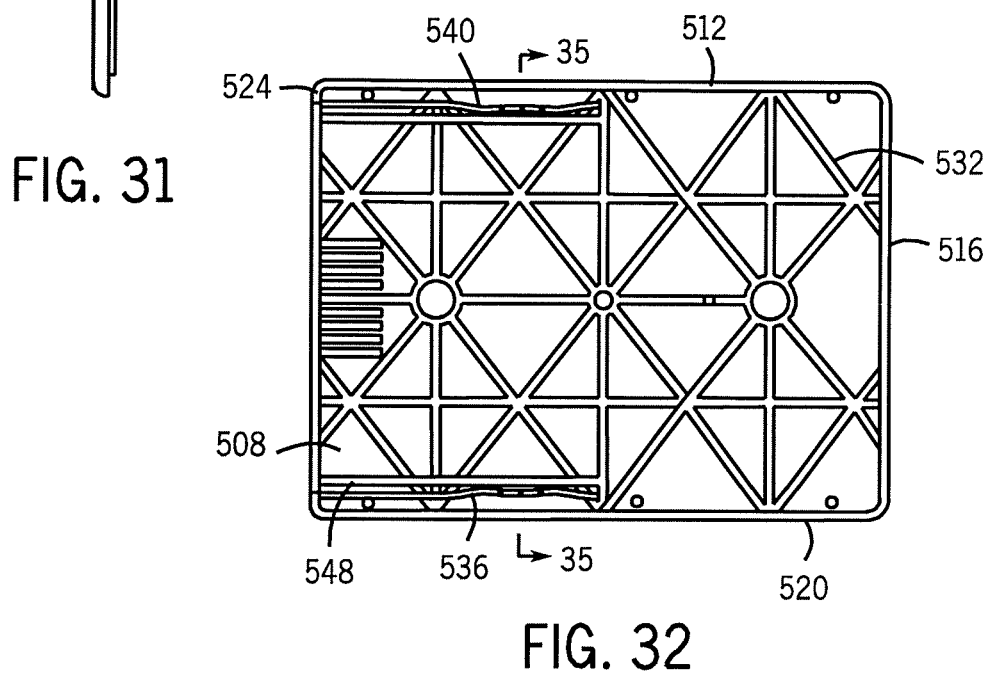
FIG. 32 is a front view of the first housing illustrated in FIG. 30.
Figure 33:
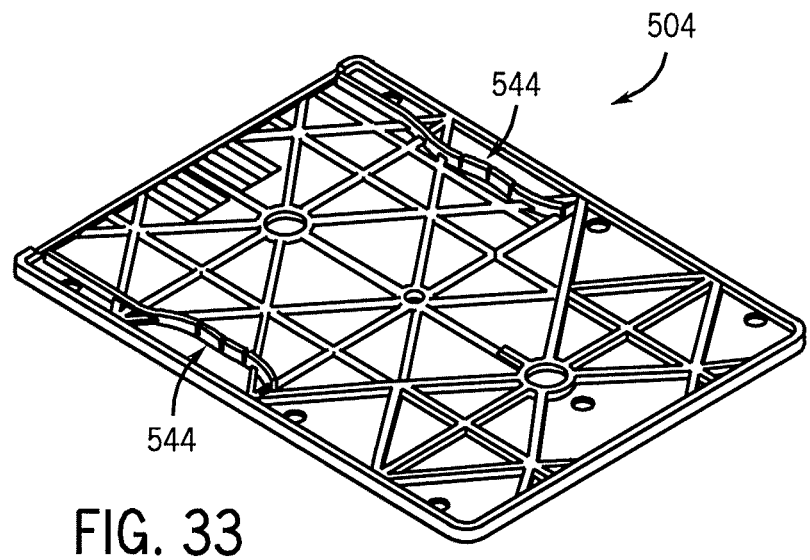
FIG. 33 is a front perspective view of the first housing illustrated in FIG. 30.
Figure 34:
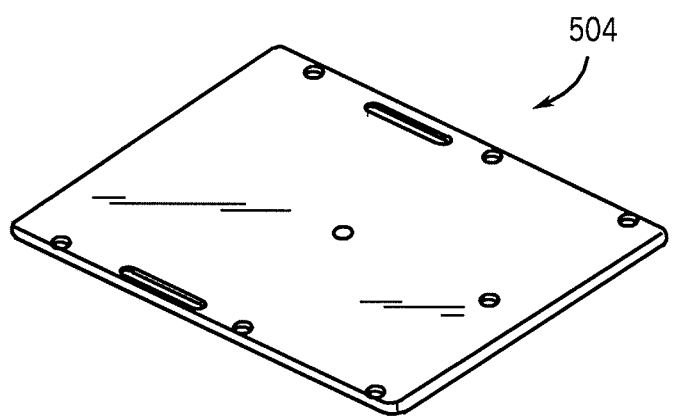
FIG. 34 is a rear perspective view of the first housing illustrated in FIG. 30.
Figure 35:
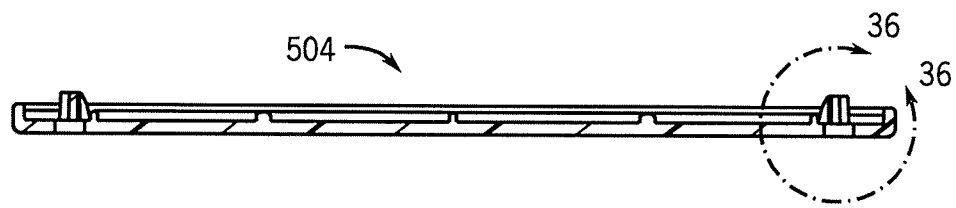
FIG. 35 is a cross-sectional view of section A-A of the first housing illustrated in FIG. 32.
Figure 36:
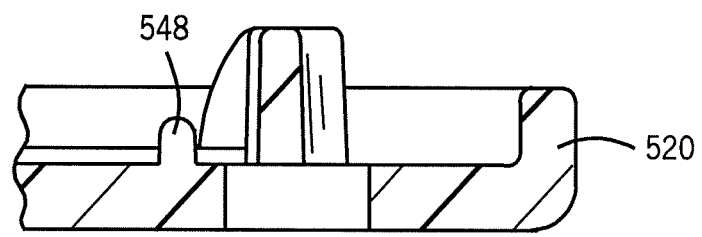
FIG. 36 is an enlarged view of section B illustrated in FIG. 35.
Figure 40:
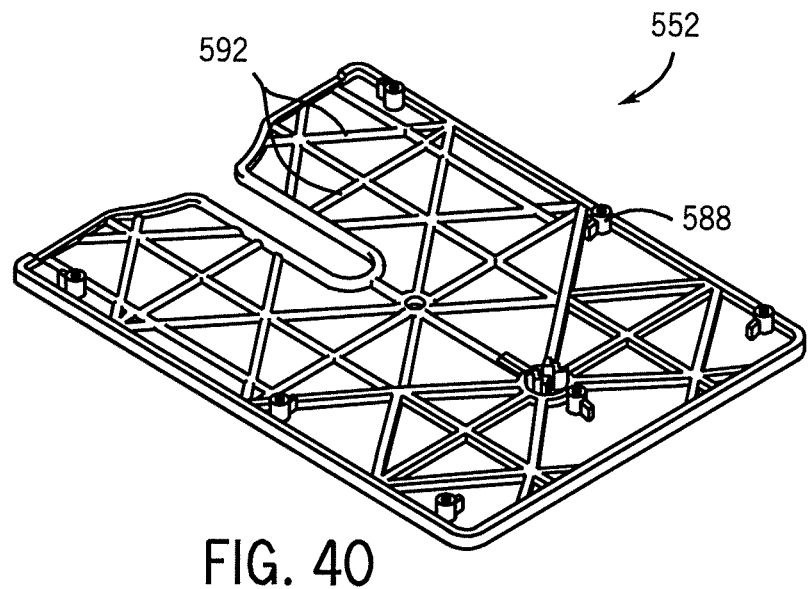
FIG. 40 is a front perspective view of the second housing illustrated in FIG. 37.
Figure 41:
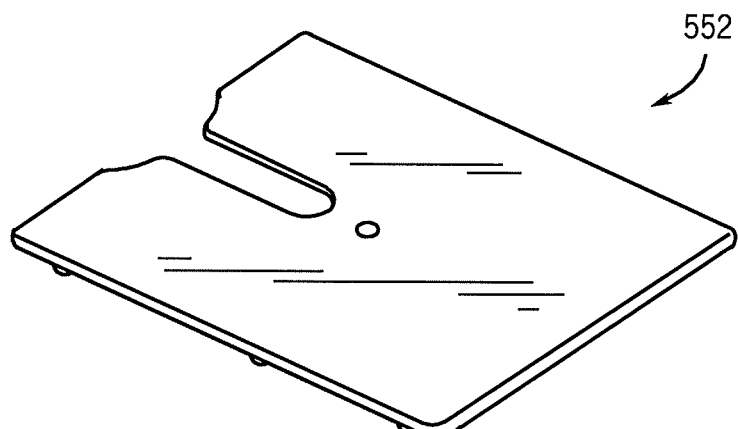
FIG. 41 is a rear perspective view of the second housing illustrated in FIG. 37.
Figure 42:
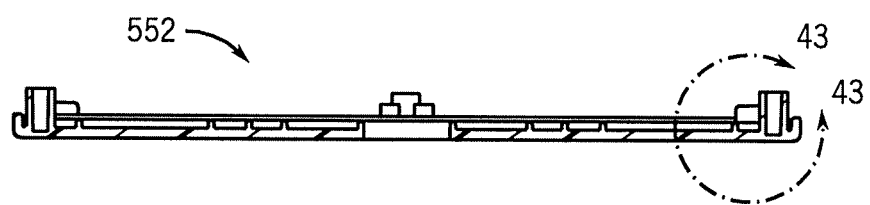
FIG. 42 is a cross-sectional view of section A-A of the second housing illustrated in FIG. 39.
Figure 43:
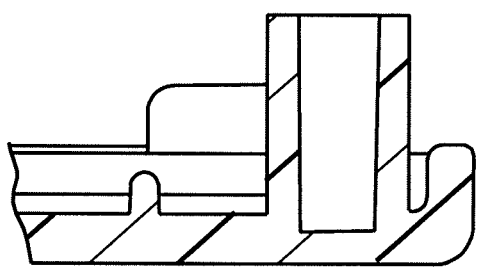
FIG. 43 is an enlarged view of section B illustrated in FIG. 42.
Figure 44:
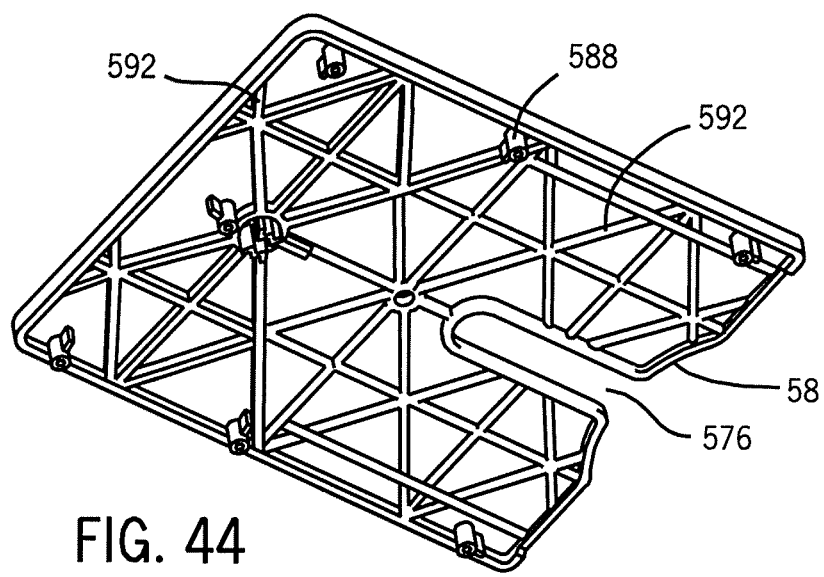
FIG. 44 is an enlarged front perspective view of the second housing illustrated in FIG. 37.
Figure 45:
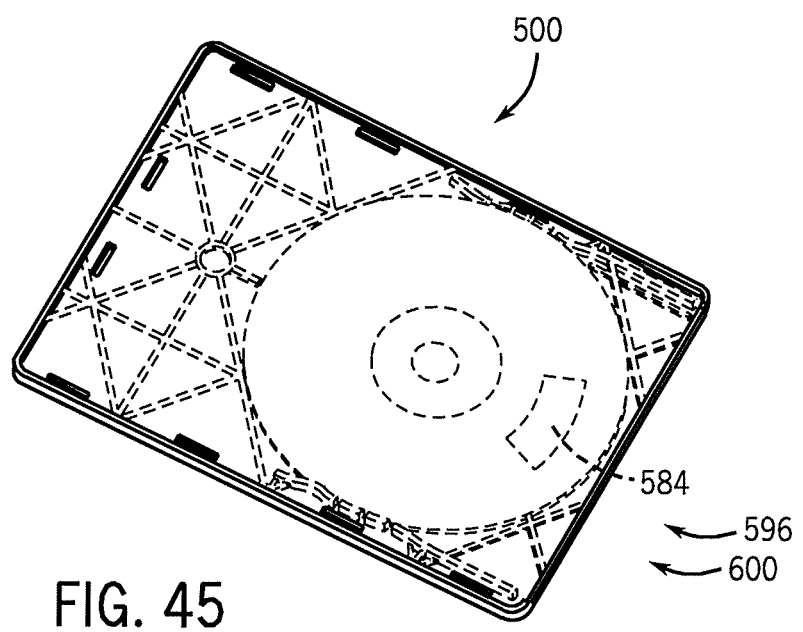
FIG. 45 illustrates the disc storage case according to the fourth embodiment of the invention.

FIGS. 1-3 illustrate a disc storage case 10 according to one embodiment of the present invention. The disc storage case 10 is adapted to support and/or protect at least one disc 14. The case 10 includes a first housing 18 having a first wall 22 substantially rectangular-shaped. The first housing 18 also includes a second wall 26, a third wall 30, a fourth wall 34, and a fifth wall 38 extending substantially perpendicular from the first wall 22. The second wall 26 is coupled to the third wall 30 and the fifth wall 38. The fourth wall 34 is coupled to the third wall 30 and the fifth wall 38. The walls 26, 30, 34, 38 are rounded at the corners. The first wall 22 is also rounded at the corners.

The first housing 18 includes a plurality of apertures 42 positioned in the first wall 22 and around an outer periphery of the first housing 18. The apertures 42 are positioned inside of the second, third, fourth, and fifth walls 26, 30, 34, 38. In some constructions, the apertures 42 can be positioned outside of or on or within the second, third, fourth, and fifth walls 26, 30, 34, 38.

The first housing 18 also includes a plurality of ribs or supports 46 on the first wall 22. The ribs 46 generally extend substantially perpendicular from the first wall and in generally straight lines from one wall 26, 30, 34, 38 to another wall

26, 30, 34, 38. Some of the ribs 46 can be wider or thicker than other ribs 46. Similarly, some of the ribs 46 can be longer than other ribs 46. In addition, some of the ribs 46 have a greater elevation than other ribs 46. For example, in the illustrated construction, the ribs 46 that are within an area sized to receive the disc 14 have a lower elevation than the ribs 46 that are located external to the area sized to receive the disc 14.

The first housing 18 also includes a channel 50 generally parallel to the second wall 26 and the fourth wall 34. The channel 50 is also centrally positioned between the second wall 26 and the fourth wall 34 and extends through the fifth wall 38. The channel 50 includes a widened mouth or scalloped portion 54. The edges of the channel 50 are rounded. The channel 50 provides access to the disc 14 and allows a user or automated handling equipment (not shown) to engage the center aperture of the disc 14 and/or a portion of the surface of the disc 14 between the outer edge of the disc 14 and the center aperture of the disc 14. The channel 50 allows for easy removal and storage of the disc 14 in the case 10. The channel 50 also allows the user or a reading system to identify a label 58 (e.g., bar code, lettering, serial number) at least partially shown on the surface of the disc 14.

The first housing 18 also includes a pair or rails or vertical supports 62 for guiding and supporting the disc 14 when being inserted into the case 10. The rails 62 extend generally parallel to one another and extend generally perpendicular from the first wall 22. The rails 62 engage the upper or lower surface of the disc 14 near the outer edge of the disc 14 to prevent the rails 62 from damaging the recorded surfaces of the disc 14. In other constructions, the rails 62 can be formed in other sections of the first housing 18. In addition, the first housing 18 can include more or fewer rails 62 (including zero) than illustrated.

The first housing 18 can also include a fabric material, such as felt or other similar materials coupled to the first wall 22. The fabric material can prevent the disc 14 from being scratched or damaged when moved into and out of the case 10.

The case 10 also includes a second housing 66 having a first wall 70 substantially rectangular-shaped. The second housing 66 also includes a second wall 74, a third wall 78, a fourth wall 82, and a fifth wall 86 extending substantially perpendicular from the first wall 70. The second wall 74 is coupled to the third wall 78 and the fifth wall 86. The fourth wall 82 is coupled to the third wall 78 and a portion of the fifth wall 86. The walls 74, 78, 82, 86 are rounded at the corners. The first wall 70 is also rounded at the corners.

The second wall 74 and the fourth wall 82 each include a recess 90 along a portion of the walls 74, 82. The recess 90 supports a flexible member 94 having a contour adapted to flex and secure the disc 14 in a storage position. The flexible member 94 is generally semi-circular-shaped with a slightly flattened portion 98. The flexible member 94 is generally formed with a spring-like quality such that the flexible member 94 can compress upon engagement of the outer edge of the disc 14. The two flexible members 94 cooperate to receive the disc 14 and laterally and/or vertically position the disc 14 in the case 10. Also, upon removal of the disc 14 from the inner space of the case 10, the flexible members 94 flex as the disc 14 is removed from the case 10. In some constructions, the second housing 66 can include more or fewer flexible members 94 than illustrated in FIGS. 1-2. In other constructions, the flexible member(s) 94 can be located in a different position than in the position illustrated in FIGS. 1-2. In yet other constructions, the flexible member(s) 94 can be located in the first housing 18.

The second housing 66 also includes a plurality of protrusions 98 positioned on the first wall 70 and around an outer periphery of the second housing 66. The protrusions 98 are positioned inside of the second, third, fourth, and fifth walls 74, 78, 82, 86. In some constructions, the protrusions 98 can be positioned outside of or on or within the second, third, fourth, and fifth walls 74, 78, 82, 86. Each of the protrusions 98 are generally aligned with one of the apertures 42 of the first housing 18 such that each of the protrusions 98 are adapted to be received by one of the apertures 42

The second housing 66 also includes a plurality of ribs or supports 102 on the first wall 70. The ribs 102 generally extend substantially perpendicular from the first wall 70 and in generally straight lines from one wall 74, 78, 82, 86 to another wall 74, 78, 82, 86. The ribs 102 are substantially aligned with the ribs 102 of the first wall 70 of the first housing 18. Some of the ribs 102 can be wider or thicker than other ribs 102. Similarly, some of the ribs 102 can be longer than other ribs 102. In addition, some of the ribs 102 have a greater elevation than other ribs 102. For example, in the illustrated construction, the ribs 102 that are within an area sized to receive the disc 14 have a lower elevation than the ribs 102 that are located external to the area sized to receive the disc 14.

The second housing 66 also includes a plurality of rails or vertical supports 106 for guiding and supporting the disc 14 when being inserted into the case 10. The rails 102 extend generally parallel to one another and extend generally perpendicular from the first wall 70. The rails 106 are generally aligned with the rails 106 of the first housing 18. Accordingly, the rails 106 engage the upper or lower surface of the disc 14 near the outer edge of the disc 14 to prevent the rails 106 from damaging the recorded surfaces of the disc 14. In other constructions, the rails 106 can be formed in other sections of the first housing 18. In addition, the first housing 18 can include more or fewer rails 106 (including zero) than illustrated.

The second housing 66 can also include a fabric material, such as felt or other similar materials coupled to the first wall 70. The fabric material can prevent the disc 14 from being scratched or damaged when moved into and out of the case 10.

The first housing 18 and the second housing 66 are coupled together to define an enclosure 110 having an opening 114 adapted to receive the disc 14. The disc 14 is stored and securely positioned within the enclosure. The apertures 42 of the first housing 18 receive the protrusions 98 of the second housing 66 to couple the housings together. The first housing 18 and the second housing 66 can include other coupling mechanisms not specifically disclosed herein. In some constructions, the first housing 18 can be permanently coupled or molded to the second housing 66.

In the illustrated construction, the first housing 18 and the second housing 66 are both generally defined by a substantially rectangular shape such that the outer periphery of the first housing 18 engages the periphery of the second housing 66 when coupled together. In other constructions, the first housing 18 and the second housing 66 can both be defined by shapes other than the rectangular shape (e.g., circular, oval, and square). In still other constructions, the first housing 18 can have a shape different than the shape of the second housing 66.

When the housings 18, 66 are coupled together, the ribs 46 of the first housing 18 and the ribs 102 of the second housing 66 are aligned and provide structural support to the case 10. For example, the ribs 46, 102 help prevent bending or flexing of the case 10 as a result of a user or a machine handling the case 10. In addition, the ribs 46, 102 define the enclosure 110 that receives the disc 14. As illustrated in FIG. 1, the disc 14 partially contacts some of the ribs 46, 102 and indicates to the user that the disc 14 is properly inserted in the case 10. The ribs 46, 102 can limit how far the disc 14 can be inserted into the case 10.

FIGS. 4-29 illustrate a disc storage case 300 according to another embodiment of the present invention. The disc storage case 300 is adapted to support and/or protect at least one disc 14. The case 300 includes a first housing 304 having a first wall 308 substantially rectangular-shaped. The first housing 304 also includes a second wall 312, a third wall 316, a fourth wall 320, and a fifth wall 324 extending substantially perpendicular from the first wall 308. The second wall 312 is coupled to the third wall 316 and the fifth wall 324. The fourth wall 320 is coupled to the third wall 316 and the fifth wall 324. The walls 312, 316, 320, 324 are rounded at the corners. The first wall 308 is also rounded at the corners.

The first housing 304 includes a plurality of apertures 328 positioned in the first wall 308 and around an outer periphery of the first housing 304. The apertures 328 are positioned inside of the second, third, fourth, and fifth walls 312, 316, 320, 324. In some constructions, the apertures 328 can be positioned outside of or on or within the second, third, fourth, and fifth walls 312, 316, 320, 324.

The first housing 304 also includes a plurality of ribs or supports 332 on the first wall 308. The ribs 332 generally extend substantially perpendicular from the first wall 308 and in generally straight lines from one wall 312, 316, 320, 324 to another wall 312, 316, 320, 324. Some of the ribs 332 can be wider or thicker than other ribs 332. Similarly, some of the ribs 332 can be longer than other ribs 332. In addition, some of the ribs 332 have a greater elevation than other ribs 332. For example, in the illustrated construction, the ribs 332 that are within an area sized to receive the disc 14 have a lower elevation than the ribs 332 that are located external to the area sized to receive the disc 14.

The first housing 304 also includes a pair or rails or vertical supports 336 for guiding and supporting the disc 14 when being inserted into the case 300. The rails 336 extend generally parallel to one another and extend generally perpendicular from the first wall 308. Accordingly, the rails 336 engage the upper or lower surface of the disc 14 near the outer edge of the disc 14 to prevent the rails 336 from damaging the recorded surfaces of the disc 14. In other constructions, the rails 336 can be formed in other sections of the first housing 304. In addition, the first housing 304 can include more or fewer rails 336 (including zero) than illustrated.

The first housing 304 can also include a fabric material, such as felt or other similar materials coupled to the first wall 308. The fabric material can prevent the disc 14 from being scratched or damaged when moved into and out of the case 300.

The first housing 304 includes a first intermediate wall 340 near the second wall 312 and a second intermediate wall 344 near the fourth wall 320. The second intermediate wall 344 includes a plurality of sections 348 having a gap between each adjacent section. When viewed as a whole, the second intermediate wall 344 includes a contour of concave portions and convex portions. The second intermediate wall 344 is adapted to flex to receive and secure the disc 14 in a storage position. The first intermediate wall 340 is similar to the second intermediate wall 344 and is not described herein. The two intermediate walls 340, 344 cooperate to receive the disc 14 and laterally and/or vertically position the disc 14 in the case 300. Also, upon removal of the disc 14 from the inner space of the case 300, the intermediate walls 340, 344 flex as the disc 14 is removed from the case 300. In some constructions, the first housing 304 can include more or fewer sections 348 of the intermediate walls 340, 344 than illustrated in FIGS. 4-12. In other constructions, the intermediate walls 340, 344 can be located in a different position than in the position illustrated in FIGS. 4-12. In yet other constructions, the intermediate walls 340, 344 can be located in the second housing 352 (discussed below).

The case 300 also includes a second housing 352 having a first wall 356 substantially rectangular-shaped. The second housing 352 also includes a second wall 360, a third wall 364, a fourth wall 368, and a fifth wall 372 extending substantially perpendicular from the first wall 356. The second wall 360 is coupled to the third wall 364 and the fifth wall 372. The fourth wall 368 is coupled to the third wall 364 and the fifth wall 372. The walls 360, 364, 368, 372 are rounded at the corners. The first wall 356 is also rounded at the corners.

The second housing 352 also includes a channel 376 generally parallel to the second wall 360 and the fourth wall 368. The channel 376 is also centrally positioned between the second wall 360 and the fourth wall 368 and extends through the fifth wall 372. The channel 376 includes a widened mouth or scalloped portion 380. The edges of the channel 376 are rounded. The channel 376 provides access to the disc 14 and allows a user or automated handling equipment (not shown) to engage the center aperture of the disc 14 and/or a portion of the surface of the disc 14 between the outer edge of the disc 14 and the center aperture of the disc 14. The channel 376 allows for easy removal and storage of the disc 14 in the case 300. The channel 376 also allows the user or a reading system to identify a label 384 (e.g., bar code, lettering, serial number) at least partially shown on the surface of the disc 14.

The second housing 352 also includes a plurality of protrusions 388 positioned on the first wall 356 and around an outer periphery of the second housing 352. The protrusions 388 are positioned inside of the second, third, fourth, and fifth walls 360, 364, 368, 372. In some constructions, the protrusions 388 can be positioned outside of or on or within the second, third, fourth, and fifth walls 360, 364, 368, 372. Each of the protrusions 388 are generally aligned with one of the apertures 328 of the first housing 304 such that each of the protrusions 388 are adapted to be received by one of the apertures 328.

The second housing 352 also includes a plurality of ribs or supports 392 on the first wall 356. The ribs 392 generally extend substantially perpendicular from the first wall 356 and in generally straight lines from one wall 360, 364, 368, 372 to another wall 360, 364, 368, 372. The ribs 392 are substantially aligned with the ribs 332 of the first wall 308 of the first housing 304. Some of the ribs 392 can be wider or thicker than other ribs 392. Similarly, some of the ribs 392 can be longer than other ribs 392. In addition, some of the ribs 392 have a greater elevation than other ribs 392. For example, in the illustrated construction, the ribs 392 that are within an area sized to receive the disc 14 have a lower elevation than the ribs 392 that are located external to the area sized to receive the disc 14.

The second housing 352 can also include a fabric material, such as felt or other similar materials coupled to the first wall 356. The fabric material can prevent the disc 14 from being scratched or damaged when moved into and out of the case 300.

The first housing 304 and the second housing 352 are coupled together to define an enclosure 396 having an opening 400 adapted to receive the disc 14. The disc 14 is stored and securely positioned within the enclosure. The apertures 328 of the first housing 304 receive the protrusions 388 of the second housing 352 to couple the housings together. The first housing 304 and the second housing 352 can include other coupling mechanisms not specifically disclosed herein. In some constructions, the first housing 304 can be permanently coupled or molded to the second housing 352.

In the illustrated construction, the first housing 304 and the second housing 352 are both generally defined by a substantially rectangular shape such that the outer periphery of the first housing 304 engages the periphery of the second housing 352 when coupled together. In other constructions, the first housing 304 and the second housing 352 can both be defined by shapes other than the rectangular shape (e.g., circular, oval, and square). In still other constructions, the first housing 304 can have a shape different than the shape of the second housing 352.

When the housings 304, 352 are coupled together, the ribs 332 of the first housing 304 and the ribs 392 of the second housing 352 are aligned and provide structural support to the case 300. For example, the ribs 332, 392 help prevent bending or flexing of the case 300 as a result of a user or a machine handling the case 300. In addition, the ribs 332, 392 define the enclosure 396 that receives the disc 14. The disc 14 partially contacts some of the ribs 332, 392 and indicates to the user that the disc 14 is properly inserted in the case 300. The ribs 332, 392 limit how far the disc 14 can be inserted into the case 300.

FIGS. 30-45 illustrate a disc storage case 500 according to another embodiment of the present invention. The disc storage case 500 is adapted to support and/or protect at least one disc 14. The case 500 includes a first housing 504 having a first wall 508 substantially rectangular-shaped. The first housing 504 also includes a second wall 512, a third wall 516, a fourth wall 520, and a fifth wall 524 extending substantially perpendicular from the first wall 508. The second wall 512 is coupled to the third wall 516 and the fifth wall 524. The fourth wall 520 is coupled to the third wall 516 and the fifth wall 524. The walls 512, 516, 520, 524 are rounded at the corners. The first wall 508 is also rounded at the corners.

The first housing 504 includes a plurality of apertures 528 positioned in the first wall 508 and around an outer periphery of the first housing 504. The apertures 528 are positioned inside of the second, third, fourth, and fifth walls 512, 516, 520, 524. In some constructions, the apertures 528 can be positioned outside of or on or within the second, third, fourth, and fifth walls 512, 516, 520, 524.

The first housing 504 also includes a plurality of ribs or supports 532 on the first wall 508. The ribs 532 generally extend substantially perpendicular from the first wall 508 and in generally straight lines from one wall 512, 516, 520, 524 to another wall 512, 516, 520, 524. Some of the ribs 532 can be wider or thicker than other ribs 532. Similarly, some of the ribs 532 can be longer than other ribs 532. In addition, some of the ribs 532 have a greater elevation than other ribs 532. For example, in the illustrated construction, the ribs 532 that are within an area sized to receive the disc 14 have a lower elevation than the ribs 532 that are located external to the area sized to receive the disc 14.

The first housing 504 includes a first intermediate wall 540 near the second wall 512 and a second intermediate wall 536 near the fourth wall 520. The second intermediate wall 536 includes a plurality of sections 544 having a gap between each adjacent section. When viewed as a whole, the second intermediate wall 536 includes a contour of concave portions and convex portions. The second intermediate wall 536 is adapted to flex to receive and secure the disc 14 in a storage position. The first intermediate wall 540 is similar to the second intermediate wall 536 and is not described herein. The two intermediate walls 536, 540 cooperate to receive the disc 14 and laterally and/or vertically position the disc 14 in the case 500. Also, upon removal of the disc 14 from the inner space of the case 500, the intermediate walls 536, 540 flex as the disc 14 is removed from the case 500. In some constructions, the first housing 504 can include more or fewer sections 544 of the intermediate walls 536, 540 than illustrated in FIGS. 32-33 and 47. In other constructions, the intermediate walls 536, 540 can be located in a different position than in the position illustrated in FIGS. 32-33 and 45. In yet other constructions, the intermediate walls 536, 540 can be located in the second housing (discussed below).

The first housing 504 also includes a plurality of rails 548 each being positioned interior of the respective intermediate walls 536, 540. The rails 548 extend generally parallel to one another and extend generally perpendicular from the first wall 508. The rails 548 are adapted to guide and support the disc 14 when it is inserted into the case 500. The rails 548 contact the upper or lower surface of the disc 14 near the outer edge of the disc 14 to prevent the rails 548 from damaging the recorded surfaces of the disc 14. In other constructions, the rails 548 can be formed in other sections of the first housing 504. In addition, the first housing 504 can include more or fewer rails 548 (including zero) than illustrated. In yet other constructions, the rails 548 can be located in the second housing (discussed below).

The first housing 504 can also include a fabric material, such as felt or other similar materials coupled to the first wall 508. The fabric material can prevent the disc 14 from being scratched or damaged when moved into and out of the case 500.

The case 500 also includes a second housing 552 having a first wall 556 substantially rectangular-shaped. The second housing 552 also includes a second wall 560, a third wall 564, a fourth wall 568, and a fifth wall 572 extending substantially perpendicular from the first wall 556. The second wall 560 is coupled to the third wall 564 and a portion of the fifth wall 572. The fourth wall 568 is coupled to the third wall 564 and a portion of the fifth wall 572. The walls 560, 564, 568, 572 are rounded at the corners. The first wall 556 is also rounded at the corners.

The second housing 552 also includes a channel 576 generally parallel to the second wall 560 and the fourth wall 568. The channel 576 is also centrally positioned between the second wall 560 and the fourth wall 568 and extends through the fifth wall 572. The channel 576 includes a widened mouth or scalloped portion 580. The edges of the channel 576 are rounded. The channel 576 provides access to the disc 14 and allows a user or automated handling equipment (not shown) to engage the center aperture of the disc 14 and/or a portion of the surface of the disc 14 between the outer edge of the disc 14 and the center aperture of the disc 14. The channel 576 allows for easy removal and storage of the disc 14 in the case 500. The channel 576 also allows the user or a reading system to identify a label 584 (e.g., bar code, lettering, serial number) at least partially shown on the surface of the disc 14.

The second housing 552 also includes a plurality of protrusions 588 positioned on the first wall 556 and around an outer periphery of the second housing 552. The protrusions 588 are positioned inside of the second, third, fourth, and fifth walls 560, 564, 568, 572. In some constructions, the protrusions 588 can be positioned outside of or on or within the second, third, fourth, and fifth walls 560, 564, 568, 572. Each of the protrusions 588 are generally aligned with one of the apertures 528 of the first housing 504 such that each of the protrusions 588 are adapted to be received by one of the apertures 528.

The second housing 552 also includes a plurality of ribs or supports 592 on the first wall 556. The ribs 592 generally extend substantially perpendicular from the first wall and in generally straight lines from one wall 560, 564, 568, 572 to another wall 560, 564, 568, 572. The ribs 592 are substantially aligned with the ribs 592 of the first wall 532 of the first housing 504. Some of the ribs 592 can be wider or thicker than other ribs 592. Similarly, some of the ribs 592 can be longer than other ribs 592. In addition, some of the ribs 592 have a greater elevation than other ribs 592. For example, in the illustrated construction, the ribs 592 that are within an area sized to receive the disc 14 have a lower elevation than the ribs 592 that are located external to the area sized to receive the disc 14.

The second housing 552 can also include a fabric material, such as felt or other similar materials coupled to the first wall 556. The fabric material can prevent the disc 14 from being scratched or damaged when moved into and out of the case 500.

The first housing 504 and the second housing 552 are coupled together to define an enclosure 596 having an opening 600 adapted to receive the disc 14. The disc 14 is stored and securely positioned within the enclosure. The apertures 528 of the first housing 504 receive the protrusions 588 of the second housing 552 to couple the housings together. The first housing 504 and the second housing 552 can include other coupling mechanisms not specifically disclosed herein. In some constructions, the first housing 504 can be permanently coupled or molded to the second housing 552.

In the illustrated construction, the first housing 504 and the second housing 552 are both generally defined by a substantially rectangular shape such that the outer periphery of the first housing 504 engages the periphery of the second housing 552 when coupled together. In other constructions, the first housing 504 and the second housing 552 can both be defined by shapes other than the rectangular shape (e.g., circular, oval, and square). In still other constructions, the first housing 504 can have a shape different than the shape of the second housing 552.

When the housings 504, 552 are coupled together, the ribs 532 of the first housing 504 and the ribs 592 of the second housing 552 are aligned and provide structural support to the case 500. For example, the ribs 532, 592 help prevent bending or flexing of the case 500 as a result of a user or a machine handling the case 500. In addition, the ribs 532, 592 define the enclosure 596 that receives the disc 14. The disc 14 partially contacts some of the ribs 532, 596 and indicates to the user that the disc 14 is properly inserted in the case 500. Some of the ribs 532, 596 limit how far the disc 14 can be inserted into the case 500.

Various features and advantages of the invention are set forth in the following claims.

What is claimed is:

1. A hinge-less disc storage case comprising:
a housing including a top wall coupled to a bottom wall with a first side wall, a second side wall, a third side wall, and a fourth side wall, the top wall, the bottom wall, and the four side walls defining an enclosure;
an opening in the fourth side wall for access to the enclosure and sized to receive an optical disc; and
a first member adjacent the first side wall and a second member adjacent the third side wall, the first member and the second member compress upon engaging an outer edge of the optical disc upon insertion and secure the optical disc within the enclosure; and
a first lining in the enclosure adjacent the top wall and a second lining in the enclosure adjacent the bottom wall, the first and second linings protecting the optical disc from scratching,
wherein the first side wall includes a first recess and the third side wall includes a second recess, and wherein a portion of the first member is positioned within the first recess, and wherein a portion of the second member is positioned with the second recess.

2. The disc storage case of claim 1 further comprising a channel in communication with the opening, the channel formed in one of the top wall and the bottom wall, a distal end of the channel being aligned with a portion of the optical disc torus.

3. The disc storage case of claim 2 wherein a proximal end of the channel is wider than the distal end of the channel.

4. The disc storage case of claim 1 wherein the first member and the second member have a width less than a width of an outer edge portion of the optical disc.

5. The disc storage case of claim 1 further comprising a plurality of ribs positioned within the top wall and the bottom wall, and wherein the ribs in the top wall and the bottom wall are substantially aligned.

6. The disc storage case of claim 5 wherein a first portion of the ribs in the top wall have an elevation less than the ribs in a second portion, and wherein a first portion of the ribs in the bottom wall have an elevation less than the ribs in a second portion, and wherein the first portion of the top wall and the first portion of the bottom wall define an area within the enclosure adapted to receive the optical disc.

7. The disc storage case of claim 1 wherein the first member is substantially semicircular-shaped with a generally flattened outer circumferential portion, and wherein the second member is substantially semi-circular-shaped with a generally flattened outer circumferential portion.

8. The disc storage case of claim 1 further comprising a first pair of rails extending from the top wall and into the enclosure and a second pair of rails extending from the bottom wall and into the enclosure, and wherein the first pair of rails and the second pair of rails cooperate to guide the optical disc into position in the enclosure.

9. A hinge-less disc storage case for storing a single optical disk comprising:
a housing including a plurality of walls and defining an enclosure;
an opening through the housing for access to the enclosure, the opening sized to receive the single optical disk;
a channel aligned with the opening, the channel adapted for use during insertion and removal of the single optical disc to guide the single optical disk into or out of the hinge-less storage case; and
a first member adjacent one of the walls of the housing and a second member adjacent a second one of the walls of the housing, at least a portion of the first member and the second member flexing upon engaging an outer edge of the single optical disc during the insertion and removal of the single optical disc through the opening; and
a lining in the enclosure for protecting a recording surface of the single optical disc from scratching,
wherein a first wall of the housing includes a first recess and a second wall of the housing includes a second recess, and wherein a portion of the first member is positioned within the first recess, and wherein a portion of the second member is positioned with the second recess.

10. The disc storage case of claim 9 wherein the channel is formed in one of the walls of the housing, and wherein a distal end of the channel is aligned with a portion of the optical disc torus.

11. The disc storage case of claim 10 wherein a proximal end of the channel is wider than the distal end of the channel.

12. The disc storage case of claim 9 wherein the first member is substantially semicircular-shaped with a generally flattened outer circumferential portion, and wherein the second member is substantially semi-circular-shaped with a generally flattened outer circumferential portion.

13. The disc storage case of claim 9 further comprising a first pair of rails extending from a third wall and into the enclosure and a second pair of rails extending from a fourth wall and into the enclosure, and wherein the first pair of rails and the second pair of rails cooperate to guide the optical disc into position in the enclosure.

14. A hinge-less disc storage case comprising:
a housing including a top wall coupled to a bottom wall with a left side wall, a right side wall, a back side wall, and a front side wall, the top wall, the bottom wall, and the four side walls defining an enclosure;
an opening in the front side wall for access to the enclosure and sized to receive a disc; a first saddle adjacent the left side wall and a second saddle adjacent the right side wall and opposing the first saddle, the first and the second saddles compress upon engaging and outer edge portion of a disc upon insertion and secure the disc within the enclosure; and
internal channels having a width less than a width of the outer edge portion on the left and right sides of the disc storage case for receiving and making contact with only outer edges of top and bottom surfaces of the disc, the internal channels are parallel to each other and cooperate to guide the optical disc into position in the storage case.

* * * * *